(12) United States Patent
Perrier (10) Patent No.: US 11,441,966 B2
(45) Date of Patent: Sep. 13, 2022

(54) DEVICE AND METHOD FOR MOVING AN OBJECT IN MOTION IN HEXAPOD POSITIONING HEAD, HAS ACTUATION DEVICE CONNECTED TO SUPPORTS

(71) Applicant: PHILOPTERE, Saint Nom la Breteche (FR)

(72) Inventor: Philippe Perrier, Saint Nom la Breteche (FR)

(73) Assignee: PHILOPTERE, Saint Nom la Breteche (FR)

( * ) Notice: Subject to any disclaimer, the term of this patent is extended or adjusted under 35 U.S.C. 154(b) by 415 days.

(21) Appl. No.: 16/499,802

(22) PCT Filed: Mar. 28, 2018

(86) PCT No.: PCT/FR2018/050759
§ 371 (c)(1),
(2) Date: Sep. 30, 2019

(87) PCT Pub. No.: WO2018/178571
PCT Pub. Date: Oct. 4, 2018

(65) Prior Publication Data
US 2020/0072695 A1 Mar. 5, 2020

(30) Foreign Application Priority Data
Mar. 30, 2017 (FR) .................................. 17 52729

(51) Int. Cl.
*G01M 1/10* (2006.01)
*G01M 1/12* (2006.01)
*G01M 7/06* (2006.01)

(52) U.S. Cl.
CPC .............. *G01M 1/10* (2013.01); *G01M 1/122* (2013.01); *G01M 7/06* (2013.01)

(58) Field of Classification Search
CPC ........ G09B 9/12; G03B 17/561; G05B 15/02; G05B 2219/49276; G05B 19/27;
(Continued)

(56) References Cited

U.S. PATENT DOCUMENTS 4,875,374 A 10/1989 Pinson
6,211,960 B1 * 4/2001 Hembree .............. H01L 21/681
356/400
(Continued)

FOREIGN PATENT DOCUMENTS

CN 101055221 A 10/2007
CN 101793582 A 8/2010

OTHER PUBLICATIONS

International Search Report related to Application No. PCT/FR2018/050759 dated Jul. 20, 2018.

*Primary Examiner* — Brandi N Hopkins
(74) *Attorney, Agent, or Firm* — von Briesen & Roper, s.c.

(57) ABSTRACT

A device for moving an object comprises a base and a platform able to receive the object; six supports each having an upper end connected to the platform and a lower end connected to the base and an actuation device connected to at least three of the supports. The upper end and lower end of each support in combination have at least five degrees of freedom. The actuation device is suited for giving predefined periodic movements to said at least three of the six supports, these three supports being called controlled supports, thus giving a periodic movement to the platform relative to the base with at least three degrees of freedom.

16 Claims, 4 Drawing Sheets

(58) Field of Classification Search
CPC ........ A63G 31/16; G01C 19/72; G01C 25/00; G01M 7/06; G01M 7/027; G01M 7/025; G01M 7/022
See application file for complete search history.

(56) References Cited

U.S. PATENT DOCUMENTS

| | | |
|---|---|---|
| 2011/0308296 A1 | 12/2011 | Sasso et al. |
| 2012/0180593 A1* | 7/2012 | Alet .................... B25J 17/0266 74/490.07 |
| 2014/0302462 A1 | 10/2014 | Vatcher et al. |
| 2016/0140862 A1* | 5/2016 | Van Lookeren Campagne ........... G09B 9/12 434/55 |
| 2016/0236100 A1* | 8/2016 | Douglas ................... G09B 9/14 |

* cited by examiner

FIG. 4 ional Application No. PCT/FR2018/050759
DEVICE AND METHOD FOR MOVING AN OBJECT IN MOTION IN HEXAPOD POSITIONING HEAD, HAS ACTUATION DEVICE CONNECTED TO SUPPORTS

CROSS-REFERENCE TO RELATED APPLICATION

This Application is a 35 USC § 371 US National Stage filing of international Application No. PCT/FR2018/050759 filed on Mar. 28, 2018 and claims priority under the Paris Convention to French Patent Application No. 17 52729 filed on Mar. 30, 2017.

FIELD OF THE DISCLOSURE

Technical Field

This document refers to devices and methods for moving an object by using a hexapod positioning head, and more specifically for determining inertial properties of the object.

BACKGROUND OF THE DISCLOSURE

When an object undergoes complex movement, it is often desirable to understand its inertial properties (e.g. mass, position of its center of gravity, inertial matrix) in order to know its behavior. Understanding of the inertial properties can be particularly desirable, for example, in the field of spatial, aeronautic, terrestrial or maritime transport, or for some sports equipment such as golf clubs.

Conventionally the mass is determined by weighing. As for the position of the center of gravity, the vertical projection of the center of gravity on the ground can be found by using, for example, three balances. For the height of the center of gravity, the object is generally placed at several inclinations, which can be difficult to do for bulky and/or heavy object.

The inertial matrix is a symmetric 3×3 matrix in which each column represents the three components of the moment of the forces that need to be applied to the object to get a unit rotational acceleration around each reference axis. For any solid object, there are three mutually orthogonal principal axes of inertia defined as the axes of rotation such that the moment to be applied is aligned with the axis. Currently, the inertial matrix is measured by placing the object on a torsion pendulum along an axis as close as possible to the principal axes of inertia thereof and by measuring the period of oscillation. Knowing the stiffness of the pendulum, the rotational inertia thereof along the test axis can be determined. There is also an analogous technique with a two-wire pendulum. However, in practice it is not always possible to use this method in the case of bulky objects. There are also devices comprising a turning platform onto which the object is placed and for which the inertial parameters are measured along the axis of rotation of the platform. However, the full inertia matrix requires repeating this operation along three independent axes of rotation, which can turn out to be prohibitive for some heavy, bulky or fragile objects.

In order to not to have to move the object for the measurements, some measurement procedures, like those described in CN101793582, use a hexapod positioning head, also called Stewart platform. The hexapod positioning head is made up of a fixed base, a mobile platform supporting the object whose inertial properties are to be measured, and six supports connecting the fixed base to the mobile platform. The six supports constitute an isostatic link between the base and the platform. By modifying the length of the supports with cylinders actuated by a motor which is specific to each, movements can be given to the platform such that the object can be rotated along several axes in order to measure the inertial properties thereof. However, this technique requires a precise synchronization of the commands for the six cylinders in order to provide successive rotational movements around three intended axes. Further, each cylinder supports an average continuous force of order 20 to 30% of the weight of the object, which can make a precise control of position and velocity difficult.

SUMMARY OF THE DISCLOSURE

A device is proposed for moving an object, where the device comprises: a base and a platform able to receive the object; six supports each having an upper end connected to the platform and a lower end connected to the base where the upper end and lower end of each support in combination have at least five degrees of freedom; and an actuation device connected to at least three of the supports, where the actuation device is suited for giving predefined periodic movements to said at least three of the six supports, these three supports being called controlled supports, thus giving a periodic movement to the platform relative to the base with at least three degrees of freedom.

The above device can comprise one or more of the following properties taken alone or in combination:

Said periodic movement is composed of at least three elementary periodic movements each defining a degree of freedom of the movement of the platform, where each of said three periodic elementary movements has a period, called elementary period, different from each other, where the elementary periods are submultiples of the period of the periodic movement of the platform, and the movements of the platform along each other periodic elementary movements are algebraically independent from each other.

The ratio between the period of the platform and the largest of the elementary periods is less than or equal to 10.

The six supports are connecting rods; and the actuation device comprises a drive device mechanically connecting said controlled supports, where the drive device is controlled by a single actuator.

The drive device includes: a central toothed gear rotatable by the actuator, and at least three peripheral toothed gears meshed with the central toothed gear, and said at least three controlled supports have the lower end thereof connected respectively and eccentrically the each of said at least three peripheral toothed gears.

The drive device includes: a central toothed gear rotatable by the actuator, three intermediate toothed gears meshed with the central toothed gears, six peripheral toothed gears meshed by pairs on each of the three intermediate toothed gears, where said at least three controlled supports are six controlled supports, and the six controlled supports have the lower end thereof connected eccentrically to each of said respective peripheral toothed gears.

The six peripheral toothed gears are grouped by same diameter pairs, where the diameters of the peripheral toothed gears of each pair are different from one pair to the next.

The same diameter peripheral toothed gears each have one center and the centers form the vertices of a hexagon and the same diameter peripheral toothed gears are arranged along opposite vertices of the hexagon that they form.

The side-by-side diameters of the pairs of same diameter peripheral toothed gears are proportional to three mutually prime integers.

The side-by-side diameters of same diameter peripheral toothed gears are respectively proportional to 4, 5 and 6, or to 10, 12 and 15.

The connecting rods connected to the peripheral toothed gears of a single same diameter pair have opposite phase.

Further comprising: at least three longitudinal force sensors associated with at least three of the six supports; and one central unit connected to the actuation device and to the at least three longitudinal force sensors, where the central unit is suited to collect force information from said at least three longitudinal force sensors.

Further comprising a position sensor suited for detecting the passage of the central toothed gear through at least three preset positions, where said position sensor communicates with the central unit for deducing from it a speed of the central toothed gear upon going by each of said at least three preset positions.

A method is also proposed for moving an object using the device proposed above and comprising the following steps: driving the device by said actuation device in a way to give a periodic movement to the platform with said at least three degrees of freedom.

The above method can comprise one or more of the following properties taken alone or in combination:

The step of driving the device comprises:

Driving the device by said actuator device in order to go by each position of a predefined set of positions of the platform with at least a first speed and a second speed, thus executing at least one first and one second measurement cycle, where the predefined set of positions comprises at least three positions for which the instantaneous movements of the platform in these positions are mutually algebraically independent;

Collecting the force information for each position of the predefined set of positions of the platform during driving with said at least first speed and second speed by the central unit; and Determining at least one inertial property by the central unit with the movements of the platform and the force information corresponding to these movements.

In which the central unit averages force information for the predefined set of positions for each of the at least first and second speeds, in order to determine said at least one inertial property.

For each of said at least first and second speeds, the central unit collects data from the position sensor of the central toothed gear for each position in the predefined set of positions of the platform, and the central unit averages data from the position sensor in order to deduce from it a real average speed of the central toothed gear for each of said at least first and second measurement cycles.

The same diameter peripheral toothed gears are driven with opposite phase for each of the first and second measurement cycles.

The step of determining the at least one inertial property from the data comprises an extraction of one average value and of components of each force by Fourier filter over the fundamental frequencies of the periodic elementary movements for each of said first and second measurement cycles.

Other features and advantages will become apparent during the following description of one of the embodiments thereof, given as a nonlimiting example, with reference to the attached drawings.

In the various figures, the same references designate identical or similar items.

DETAILED DESCRIPTION OF THE DISCLOSURE

A device for movement of an object by a hexapod positioning head is going to be described. In a preferred embodiment, the device is used to calculate the inertial properties of the object. However, other applications are possible. These applications may or may not include calculations of properties of the moving object. The described device gives a predefined periodic movement to the object sweeping three or more degrees of freedom from the movement space. The choice of the number of degrees of freedom of the movement can match a chosen application. For example, for the calculation of an inertial matrix, a movement with only three degrees of freedom may be desirable. In another example, for mixing products contained in the object, a movement with six degrees of freedom may be desirable. A method for moving the object by using the device will also be described.

Figure 1:
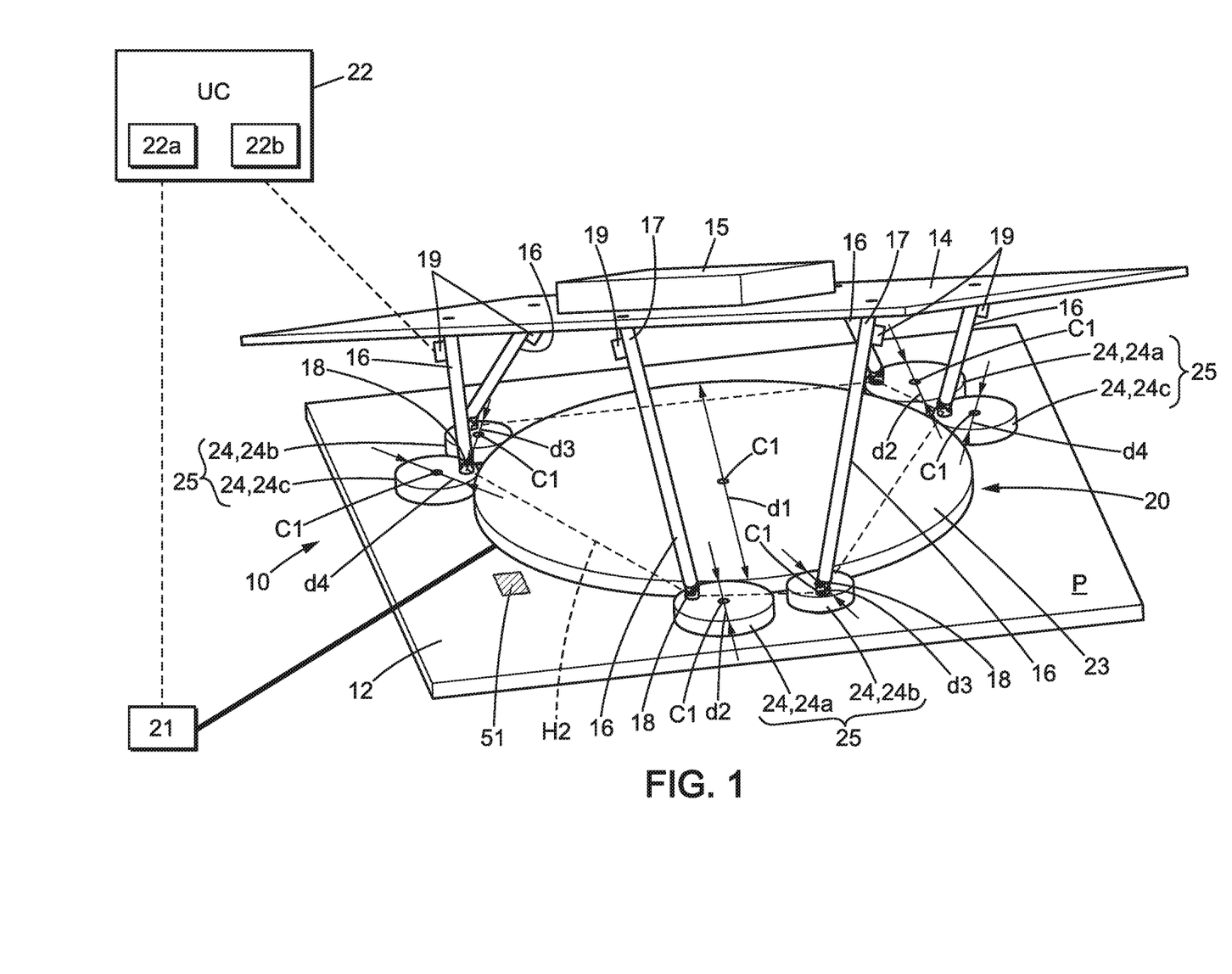
FIG. 1 is a perspective schematic view of a hexapod positioning head having a drive device according to an embodiment.

With reference to FIG. 1, a hexapod positioning head 10 includes a base 12, a platform 14 for receiving an object 15 and six supports 16 binding the base 12 to the platform 14. Preferably, the hexapod positioning head 10 has a diameter of order the size of the object 15. In this embodiment, the supports 16 are connecting rods. The upper ends 17, or heads, of the connecting rods 16 are connected to the platform 14 and the lower ends 18, or feet thereof are connected to the base 12. The lower ends 18 of at least three connecting rods 16 are connected to the base 12 by means of an actuation device for moving the platform 14. The connecting rods 16 moved by the actuation device are referred to as controlled connecting rods or supports. The controlled supports are connected mechanically to each other by the drive device. In another embodiment, described below, the drive device does not tie the controlled supports with each other mechanically, but via a central unit.

The connections to the upper ends 17 and lower ends 18 are chosen such that for each connecting rod 16 these connections have combined at least five degrees of freedom. The connection to the upper ends 17 and lower ends 18 of the connecting rods 16 are socket joint or gimbal mount type. The connecting rods 16 are connection axes which do not vary in length, as would be the case for cylinders, but for which movement thereof in space leads to movement of the platform 14. Thus, the socket joint or gimbal mount type connections allow the movement of the connecting rods 16 by providing that these only transmit forces aligned with the axis thereof.

The distribution of connecting rods 16 relative to the platform 14 and the base 12 form two hexagons. The upper ends 17 generally define a hexagon H1 (shown in FIG. 3 for a different embodiment of the hexapod positioning head 10). In an embodiment, the hexagon H1 is irregular. The lower ends 18 generally define a hexagon H2 (shown dotted). In an embodiment, the hexagon H2 is irregular.

The base 12 is fixed at least during use of the device 10. The actuation device comprises, in this embodiment, a drive device 20 and a single actuator 21. The drive device 20 is secured to the base 12. In an embodiment, the actuator 21 is an electric motor. The drive device 20 is a mechanical link between the controlled connecting rods which gives a spatially periodic movement to the lower ends 18 of the controlled connecting rods 16. The spatially periodic movement of the connecting rods 16 gives a periodic movement to the platform 14 relative to the base 12. Although a single motor 21 moves the drive device 20 for the connecting rods 16, it is conceivable that several motors could drive the connecting rods 16, for example, by groups of connecting rods 16. Although this embodiment shows the actuation of the connecting rods 16 by the lower end 18, it is possible that the upper ends 17 or else another part of the connecting rods 16 may be moved by the drive device 20. Further, it may be that 3, 4, 5 or all 6 connecting rods 16 are controlled supports.

In an embodiment shown in FIG. 1, the drive device 20 includes a central toothed gear 23 and six peripheral toothed gears 24 meshing with the central toothed gear 23. Each peripheral toothed gear 24 receives one lower end 18 of the connecting rods 16 (meaning one connecting rod 16 per peripheral toothed gear 24 and vice-versa). Each connecting rod 16 is preferably oriented so as to extend along a direction substantially separated from an axis of rotation of the peripheral toothed gear 24 onto which it is connected. The lower ends 18 of the connecting rods 16 are connected eccentrically to the peripheral toothed gear 24 associated therewith (meaning a connection outside of the center of each peripheral gear 24). Even though the embodiment shown in FIG. 1 shows the six connecting rods 16 moved by peripheral toothed gears 24, it is conceivable that 3, 2 or 1 of these connecting rods 16 could have the lower ends 18 thereof linked directly to the base 12 (meaning without rotational movement by the peripheral toothed gears 24), for example by socket joint or gimbal mount links. Thus, the drive device 20 could have only 3, 4 or 5 peripheral toothed gears 24.

The central toothed gear 23 is connected to the motor 21 such that driving the central toothed gear 23 moves the peripheral toothed gears 24 and therefore the connecting rods 16. Because of this configuration, for each position of the central toothed gear 23, there is a unique position of the platform 14 and a single motor 21 can suffice for moving the platform 14.

In the embodiment from FIG. 1, the peripheral toothed gears 24 are overall distributed around the central toothed gear 23 by pairs of gears 25. The peripheral toothed gears 24 are arranged in a single plane P with the central toothed gear 23. However it is conceivable that the peripheral toothed gears 24 could be arranged in a different plane. For example, the peripheral toothed gears 24 could be arranged in a plane perpendicular to the plane P of the central toothed gear 23, or else such that the axes of rotation of the peripheral toothed gears are substantially different from the average direction of the connecting rod 16 associated therewith. The peripheral toothed gears 24 could also be variously distributed around the central toothed gear 23.

The central toothed gear 23 has a diameter d1 greater than the diameters of the peripheral toothed gears 24. It could, however, be that the diameter D1 of the central toothed gear 23 is smaller than some or all of the peripheral toothed gears 24. Some peripheral toothed gears 24 could have a shared diameter. For example, as shown in FIG. 1, the peripheral toothed gears 24 are grouped in three pairs of gears 24a, 24b, 24c, where the gears from each pair 24a, 24b, 24c have a respective diameter d2, d3, d4 which is specific to that pair. In the embodiment shown in FIG. 1, the peripheral toothed gears from each pair 24a, 24b, 24c (which have the same diameter) are arranged such that the centers C2 thereof form the vertices of an irregular hexagon. In this embodiment, the centers of the peripheral toothed gears from a single pair 24a, 24b, 24c of the same diameter are opposite vertices of the hexagon. Just the same, it is conceivable that the same diameter peripheral toothed gears 24 might not be arranged such that the centers thereof are opposite vertices of the hexagon that they form. For example, the same diameter gears could be adjacent. Even though in this embodiment the peripheral toothed gears 24 are shown as being groupable by same diameter pairs, it is also possible that all the diameters of the peripheral toothed gears 24 are different. It could also be that the peripheral toothed gears 24 are not groupable by same diameter pair.

The drive device 20 and the eccentric connection of the connecting rods 16 are chosen such that the controlled connecting rods give the platform 14 predefined periodic movements having at least three degrees of freedom. A periodic movement has at least three degrees of freedom if, during one period, there are at least three positions for which the instantaneous movements of the plateau at these positions are mutually independent (i.e. algebraically independent). An instantaneous movement is characterized by the instantaneous combination of a translation and a rotation. In some cases, the instantaneous movement is a simple rotation, in other cases a simple translation, or even a combination of a translation and a rotation. A set of instantaneous movements is called independent if none of the associated translation/rotation pairs can be expressed as a linear combination of the others. For example, three instantaneous movements are independent if the associated three instantaneous axes of rotation are not coplanar or if the three instantaneous directions of translation are not coplanar.

A periodic movement having at least three degrees of freedom can be obtained by combining three elementary periodic movements with a single degree of freedom having three different periods, on the condition that these three periodic elementary movements correspond to mutually independent displacements. When the periods of the three elementary periodic movements, called elementary periods, are submultiples of the period of the combined movement, the combination of the three elementary periodic movements constitutes a periodic movement. In the case of a hexapod type configuration, any controlled displacement of just one of the support heads, while the five other links keep a constant length, produces a movement with only one degree of freedom. Similarly, any combination of controlled movements of two or more support heads, while the other supports keep a constant length, only produces a displacement with just one degree of freedom if the controlled displacements are mutually proportional. Similarly, if, in a specific embodiment, two connecting rod feet are mounted on eccentric gears driven with movements of the same period in phase or in phase opposition, the resulting movement of the platform will have only one degree of freedom. Conversely, if the movements of the gears are not in phase or in phase opposition, in particular if they are in phase quadrature or have different periods, a movement of the platform with two degrees of freedom results.

Thus, the periodic movement of the platform is composed of at least three elementary periodic movements each defining one degree of freedom of the platform, i.e. the movements of the platform along each of said at least periodic elementary movements are mutually algebraically independent. Movements are mutually algebraically independent when each movement taken in isolation is not a linear combination of the other movements also taken in isolation. Because of the isostatic link itself which makes up a hexapod positioning head, the movement of the platform 14 induced by the movement of one of the controlled connecting rods taken in isolation (i.e. the component of the movement of only a single connecting rod 16 is considered, the others being considered fixed) is not a linear combination of the movement of the platform 14 given by each of the other controlled connecting rods 16 taken in isolation. However, if two or more connecting rods 16 are moved synchronously, it is possible to create a movement with a single degree of freedom. This is in particular the case if the synchronized connecting rods have the same period and are in phase or phase opposition. As many algebraically independent movements are selected as desired degrees of freedom of the movement (3, 4, 5 or 6). In an embodiment, having a periodic movement of the object 15 having at least three degrees of freedom comprising at least three independent axes of rotation is sufficient for determining the inertial properties of the object 15, as will be described in greater detail below. Further, the elementary periods are mutually different and are submultiples of the period of the periodic movement of the platform. One way to implement, for example, three mutually algebraically independent movements is, for example, by having at least three peripheral toothed gears 24 with different diameters driving connecting rods 16 in rotation. One way to implement six algebraically independent movements could be to have the peripheral toothed gears 24 grouped by same diameter pairs, where the three pairs have different diameters, and the gears from each pair are placed in phase quadrature relative to each other, meaning that one of the connecting rods is at the average position thereof when the other is at an extreme position. When the peripheral toothed gears 24 have different diameters, the platform 14 is then driven with a movement whose period is the least common multiple of the periods of rotation of the peripheral toothed gears 24 supporting the connecting rods 16.

Figure 2:
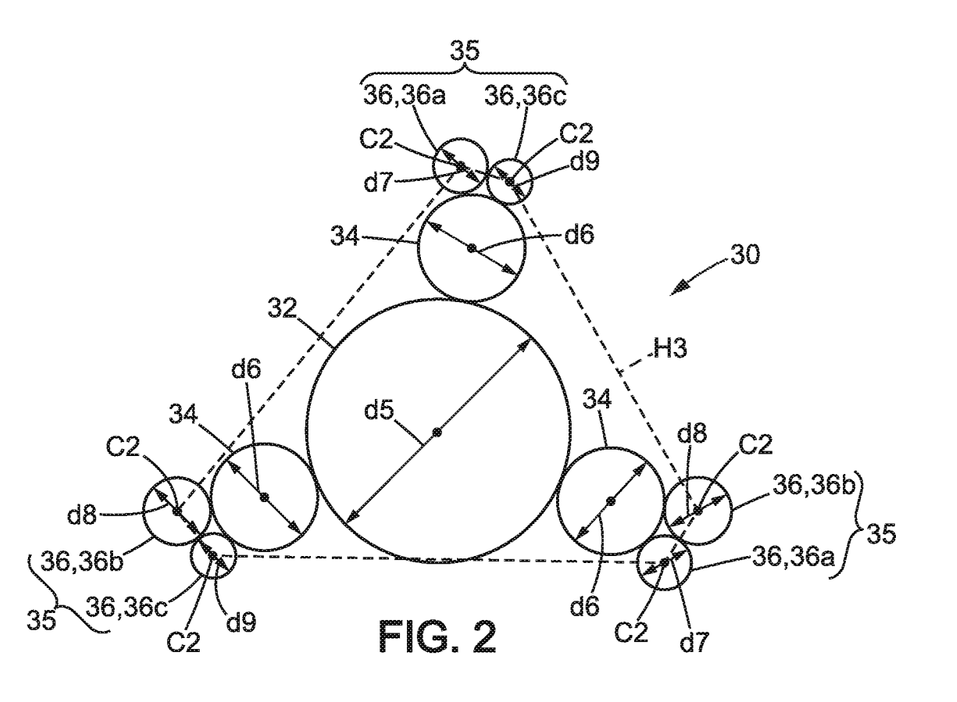
FIG. 2 is a top planar schematic view of a drive device according another embodiment for the hexapod positioning head from FIG. 1.

Referring to FIG. 2, in another embodiment, a driving device 30 for the controlled connecting rods 16 is composed of a central toothed gear 32 drivable by the motor 21 and three intermediate toothed gears 34 meshed with the central toothed gear 32. The driving device 30 and the eccentric connection of the connecting rods 16 to the driving device 30 give the platform 14 a periodic movement having at least three degrees of freedom, similar to the driving device 30 described above.

Six peripheral toothed gears 36 mesh with the intermediate toothed gears 34 by pairs 35. Thus, each of the three intermediate toothed gears 34 is meshed both with a central toothed gear 32 and also with a group 35 of two peripheral toothed gears 36. The central toothed gear 32 has a diameter d5 preferably greater than the diameters d6 of the intermediate toothed gears 34. The intermediate toothed gears 34 may all have the same diameter d6 (as shown in FIG. 2), or else have different diameters. The intermediate toothed gears 34 have, in this embodiment, a diameter greater than the diameters of the peripheral toothed gears 36. It could, however, be that the diameter of the central toothed gear 32 is smaller than some or all of the diameters of the intermediate toothed gears 34 and/or peripheral toothed gears 36. Similarly, it could be that the diameter of some or all of the intermediate toothed gears 34 is less than some or all of the diameters of the peripheral toothed gears 36. In an embodiment, such as shown in FIG. 2, the peripheral toothed gears 36 are grouped in three pairs 36a, 36b, 36c, where the peripheral toothed gears 36 of each pair 36a, 36b, 36e have a respective diameter d7, d8, d9 different from other pairs. In this embodiment, the peripheral toothed gears 36 of a single group 36a, 36b, 36c are arranged such that the centers thereof are opposite vertices of a hexagon H3 (shown dotted) formed by the centers C2 of the peripheral toothed gears 36. However, it is conceivable that the same diameter peripheral toothed gears 36a, 36b, 36c might not be arranged at opposite vertices of the hexagon H3 and/or not arranged by pairs of same diameter gears. It is also conceivable that the peripheral toothed gears 36 could be meshed with the intermediate toothed gears 34 with an arrangement other than by pairs.

Similarly to the drive device 20, for each position of the central gear 32 of the drive device 30 driven by the motor 21, there is a single position of the platform 14. Even though the embodiment from FIG. 2 shows six connecting rods 16 moving, it is conceivable that 3, 2 or 1 of these connecting rods 16 could have their lower ends 18 directly connected to the base 12, for example by socket joint or gimbal mount links. Thus, the drive device 30 could have only 3, 4 or 5 peripheral toothed gears 36.

Similarly to the drive device 20, the drive device 30 and the eccentric connection of the connecting rods 16 is predefined such that the controlled connecting rods give the platform 14 a periodic movement having at least three degrees of freedom (choice of diameters of the peripheral gears and connections to the controlled connecting rods for dephasing or not the movements of the connecting rods relative to each other).

Whether for the drive device 20 or the drive device 30, in the specific case where the peripheral toothed gears 24 (or 36) are matched by pairs of diameters, the algebraic independence with three degrees of freedom can be achieved by having at least the period different between the pairs (i.e. peripheral gears with different diameters by pair). To get an algebraic independence having six degrees of freedom (if called for by the application, for example for mixing products in the object 15), within each pair having the same period of movement, the phases are different (e.g. in quadrature). When the connecting rods 16 are in phase opposition within a pair, then, at a given moment during the movement thereof, the lower ends 18 are aligned with the centers C2 of the pair of peripheral toothed gears 36a or 36b or 36c, and the center C2 of these gears are arranged inside the lower ends 18. In an embodiment, in phase opposition, there is at least one point among the positions of the moving platform 14 where the lower ends 18 of the three pairs of connecting rods 16 are simultaneously aligned with the corresponding centers of the pairs of peripheral toothed gears 36a or 36b or 36c, on the inside or outside of the centers of the corresponding peripheral toothed gears 36a or 36b or 36c.

When the connecting rods 16 from one pair of connecting rods 16 connected to one of the pairs of peripheral toothed gears 36a or 36b or 36c are in phase opposition, a fixed point of the platform 12, also known by the name steady point, appears. Thus, the platform 14 only moves in rotation around the steady point, meaning without executing translational movements which would be parasitic for the calculation of the inertial matrix. Making a steady point appear can simplify the calculations of the inertial properties, for example. The projection of the steady point on the platform 14 is at the barycenter of the vertices of the hexagon formed by the upper ends 17 of the connecting rods 16. If this hexagon is regular, it is at the barycenter (no projection). If the edges of the hexagon corresponding to the pairs 25 of connecting rods 16 are smaller than the other edges, then the steady point is located above the plane of this hexagon. This arrangement can be particularly favorable because it serves to bring the center of gravity of the object 15 closer to this steady point and, thus, to limit the movements thereof, since the movements the platform 14 then correspond to rotation around instantaneous axes passing near the center of gravity.

In an embodiment, the pairs 24a, 24b, 24c (or 36A, 36b, 36c) of same diameter peripheral toothed gears 24 (or 36) have diameters which are respectively proportional to the first three mutually prime integers. Thus, the elementary periods of the elementary movements of the controlled supports (taken pairwise) are proportional to these same integers. The least common multiple (LCM) of the elementary periods of each pair of connecting rods 16 defines the period of one complete cycle of the predefined positions through which the platform 14 is going to pass, meaning the period of the movement of the platform. In one embodiment, the elementary periods are chosen such that the ratio between the period of the platform and the largest of the three elementary periods is the smallest possible so as to minimize the period of the complete cycle of the predefined positions of the platform 14. In a preferred embodiment, the elementary periods of the movements of the pairs of connecting rods 16 are respectively proportional to 4, 5 and 6 giving an LCM of 60. This leads to a period for the complete cycle of the platform 14 proportional to 60, or respectively 15, 12 and 10 turns of each pair of gears 24a, 24b, 24c (or 36a, 36b, 36c). In an embodiment, the ratio between the period of the platform and the smallest elementary period of said at least three elementary movements is less than or equal to 15. In an embodiment, the ratio between the period of the platform and the largest elementary period of said at least three elementary movements is less than or equal to 10. According to a possible application, the movement of the platform is thus chosen for deducing with a minimum of movement cycles an inertial matrix for the object 15 more quickly and more easily. In another embodiment, the periods of the movements of the pairs of gears 24a, 24b, 24c (or 36a, 36b, 36c) are respectively proportional to 10, 12 and 15, which leads to a period for the full cycle proportional to 60, which is respectively 6, 5 and 4 cycles of each pair of connecting rods.

In one embodiment, the elementary periods of the movements of the pairs of connecting rods 16 are chosen with the same order of magnitude such that the contributions of each pair of connecting rods 16 to the accelerations communicated to the object 15 are also the same order of magnitude.

In an embodiment, the eccentricity of the lower ends 18 of the connecting rods 16 is as large as allowed by the diameter of the peripheral toothed gears 24 (or 36) to which each foot is connected, and the radii of eccentricity (i.e. distance between the lower end 18 of the connecting rods 16 and the center of the associated peripheral toothed gear) of both connecting rods of a single pair are identical.

As the connecting rods 16 are linked to each other mechanically by the drive device 20 (or 30) in the embodiments, the drive device 20 (or 30) can be actuated by a single motor 21 connected to the central toothed gear 23 (or 32). One advantage of this configuration is that the instantaneous power of the motor 21 can be low because the total kinetic energy of the device is almost constant for constant speed of the drive device. This further gives the drive device a better velocity precision and stability. In an embodiment, the motor 21 is an electric motor. In an embodiment, the motor 21 commands the central toothed gear 23 (or 32) via a set of reducing pinions. It is however possible that the actuation device is such that more than one motor actuates the drive device.

It is conceivable that the drive device for the hexapod 10 can have different implementations which could give a periodic movement to the platform in at least three degrees of freedom. Such an embodiment could further not contain toothed gears. For example, the drive device could comprise gears driving each other by friction, smooth or notched belts, opinions, bellcranks and/or gearboxes, or electric, hydraulic, pneumatic or other transmissions. These embodiments could for example be chosen depending on the size of the object 15 to be measured.

The hexapod positioning head 10 optionally includes means for measuring the forces experienced by the object to be measured during periodic movements. These means could take the form of a platform of sensors arranged between the platform 14 and the object 15. These means can also be made up of force sensors 19 which collect longitudinal forces experienced by the connecting rods 16. The device 10 includes at least three force sensors 19 and preferably six, one per connecting rod 16. The force sensors 19 are associated with connecting rods 16 in order to measure the longitudinal forces on the connecting rods 16 during movements of the platform 14. The longitudinal forces include compression and traction forces. The force sensors 19 can be for example force sensors placed at one end of the connecting rods 16 or else strain gages placed directly on the connecting rods 16. The force sensors 19 can be placed on any connecting rod 16, controlled or not. In the scenario where the connecting rods 16 are arranged by pairs on the peripheral toothed gears 24a, 24b, 24c (or 36a, 36b, 36c) having the same diameter, there could be a single force sensor 19 per pair of connecting rods 16.

The force sensors 19 communicate with a central unit 22 which, in an embodiment, deduces the inertial properties of the object 15 from them. With the information provided by the force sensors 19, the torsor of the forces experienced by the device 10 for example can be measured and then the relation between the longitudinal forces in the connecting rods 16 and the torsor of the forces applied to the platform 14 (and therefore experienced by the object 15) is bijective. The torsor of the forces applied to the assembly of the platform 14 and the object 15 is proportional to the inertial properties of this assembly. Thus, the inertial properties of the object 15 alone can be deduced by also measuring the inertial properties of the empty platform 14 by using the same principle as that for the tare of a conventional scale.

The central unit 22 comprises a communication module 22a which receives force information about the connecting rods 16 from the force sensors 19 and position information about the central toothed gear 23 from the sensor 51, and a calculation model 22b which determines one or more properties of the object 15 based on the force information from the force sensors 19. With the force information, the calculation module 22b can determine, in one embodiment, a mass of the object 15, and/or a position of the center of gravity 15, and/or an inertial matrix of the object 15, according to a method which will be described below. The communication module 22a communicates with the calculation module 22b and with the display (not shown) for displaying the properties found by the calculation module 22b.

Optionally, the communication module 22a could receive information about rotational speed of the device 10. In fact, the rotational speed of the motor 21 as intended by the manufacturer of the motor according to the command, could be too imprecise. Thus in an embodiment, the actual speed of the device 10 is determined by calculating a rotational speed of the central toothed gear 23 (or 32) based on information from a position sensor 51. In an embodiment, the position sensor 51 detects the moments of going by predefined and regularly spaced positions of the central toothed gear 23 (or 32) (for example optical coder or rotary encoder). In another embodiment, the position sensor 51 is arranged on another toothed gear of the drive device 20 (or 30) where the central toothed gear 23 (or 32). The predefined positions can, for example, be defined by the teeth of the toothed gear on which the position sensor 51 is placed. In these cases, the device measures the moments of going by the predefined positions and the rotation speed can be calculated by finite differences from the times of going by two successive positions. In the same way, if the drive speed is not constant, the acceleration can be calculated from times of going by three successive positions.

The calculation module 22b and/or the communication module 22a could be separate from each other and or from the central unit 22. For example, the central unit 22 could receive an external supply and be connected by a USB cable to a computer which would make use of the measurements.

Figure 3:
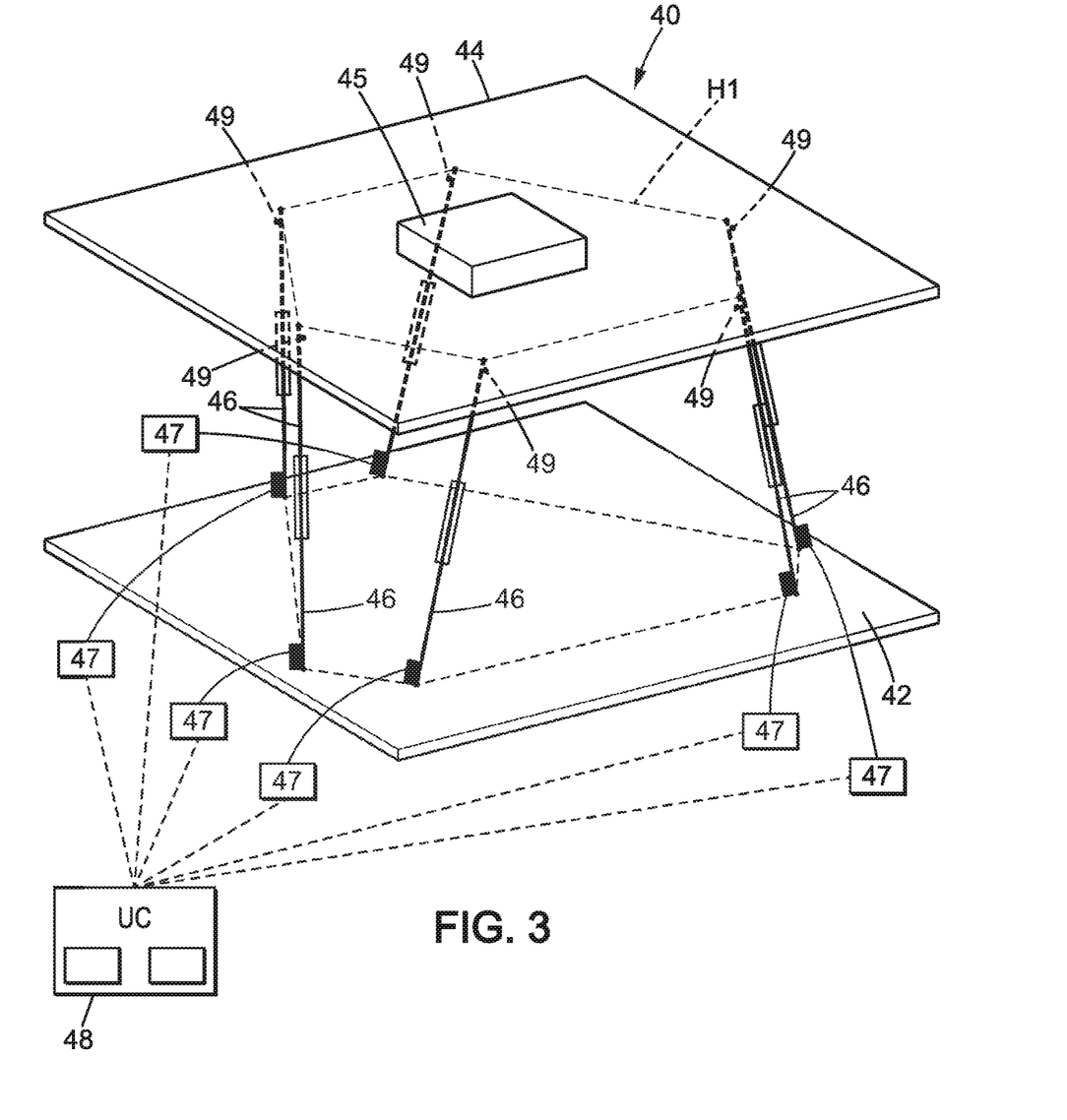
FIG. 3 is a perspective schematic view of a hexapod positioning head according to yet another embodiment.

Now referring to FIG. 3, another embodiment of a hexapod positioning head 40 is shown schematically. The hexapod positioning head 40 is similar to the hexapod positioning head 10, but has cylinders for supports instead of connecting rods and an actuating device which does not mechanically link the cylinders to each other. The hexapod positioning head 40 includes a base 42, a platform 44 for receiving an object 45 and six cylinders 46 connecting the base 42 to the platform 44. The cylinders 46 could be electric, pneumatic or hydraulic. The platform 44 is moved by the actuation device. The actuation device comprises several actuators. Each cylinder 46 is moved (lengthening or shortening) by an actuator, typically a respective motor, 47 (respective meaning one actuator 47 per cylinder 46). The actuators 47 are controlled by a central unit 48 similar in structure to the central unit 22 and which synchronizes the actuators 47. The central unit 48 controls the actuators 47 such that the actuators 47 give a spatially periodic movement to the cylinders 46. Further, mutually, the cylinders 46 have a predefined periodic movement such that the platform 44 is driven with a periodic movement with at least three degrees of freedom, similar to that discussed above for the hexapod positioning head 10. As discussed above for the system 10, a movement has at least three degrees of freedom if it is the combination of at least three algebraically mutually independent periodic elementary movements. A simple way of getting at least three algebraically mutually independent movements is to actuate at least three cylinders 46 according to different periods, called elementary periods, which are submultiples of the period of the periodic movement of the platform 14.

The hexapod positioning head 40 preferably includes four sensors 49 which collect the longitudinal forces experienced by the cylinders 46. The force sensors 49 communicate with the central unit 48 which, in an embodiment, deduces the inertial properties of the object 45 from them. The lower ends of the cylinders 46 are connected to the base 42, for example by socket joint or gimbal mount links. The upper ends of the cylinders 46 are connected to the platform 44, for example by socket joint or gimbal mount links.

Regardless of the embodiment of the hexapod positioning head 10 (or 40) above, the controlled supports (for example connecting rods 16 or cylinders 46) are driven such that they have a spatially periodic movement. Thus, for mechanical drive device, such as devices 20 and 30, the spatially periodic movement is given by the rotation of various toothed gears, with the lower ends 18 of the connecting rods 16 describing circles when moved, because they are connected eccentrically to the peripheral toothed gears 24 (or 36). For a drive device involving controlled supports which can vary in length, like the cylinders 46, there associated actuators 47 give periodic movements of lengthening and shortening. The controlled supports can be driven at constant speed or a variable speed. However, it could be preferable to drive the controlled supports with constant speed for applications such as the calculation of inertial properties, because at constant speed, for a given position, the inertial forces are directly proportional to the square of this speed.

Further, regardless of the embodiment of the hexapod positioning head 10 (or 40) above, the controlled supports (for example connecting rods 16 or cylinders 46) are driven in movement such that the platform 14 (or 44) has a predefined periodic movement with at least three degrees of freedom. This predefined movement can be independent of the object, meaning the size, shape and/or weight thereof. Thus, the same periodic movement of the platform can be used for determining the inertial matrix of various objects, so, inertial measurements can be done more quickly between different objects. In the case of the drive device 40 with cylinders 46, involving the use of actuators 47 associated with each cylinder 46, the actuators 47 are programed according to at least three independent periodic functions (and different periods and different submultiples of the period of the platform) in order to get algebraic independence of the movement of the platform. In contrast, in the case of a mechanical drive device with toothed gears such as the drive device 20 (or 30), this algebraic independence can be established by playing on the parameters of the drive device 20 (or 30) (e.g. the mutual ratios of the diameters of the peripheral gears 24 (or 36)) and the relation thereof to the controlled supports (e.g. phase opposition, phase quadrature, in phase).

Figure 4:
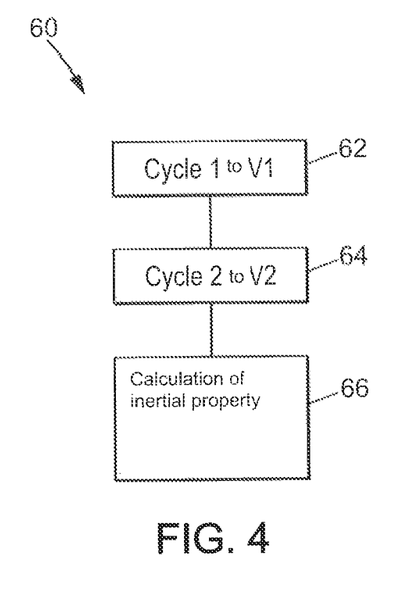
FIG. 4 is a logic chart showing a method for use of a hexapod positioning head such as those from FIGS. 1 to 3.

Now referring to FIG. 4, a method 60 for determining inertial properties of the object by using one of the devices 10 or 40 described above is going to be described. The method 60 comprises the following steps.

In step 62, the device 10 (or 40) is driven in movement by the motor 21 (or actuators 47) in a first cycle of measurements. The first cycle of measurements is done by driving the platform 14 at a first speed V1 (or minimal speed). In this example, the platform 14 (or 44) passes through each point of a predefined set of measurement points at this first speed V1. The predefined set of measurement points includes a plurality of measurement points including at least three points associated with three independent instantaneous movements of the platform 14 (or 44). The three independent instantaneous movements are three movements for which the instantaneous axes of rotation and or translation of the platform 14 (or 44) are three non-coplanar vectors. The three non-coplanar vectors preferably form a trihedron as close as possible to an orthogonal trihedron. An increased quantity of measurement points improves the precision of the measurements by enabling filtering different types of measurement noises. It is thus advantageous to have at least five measurement points per cycle of the pair of connecting rods 16 with the shortest period. Just the same, only a small number of measurement points can suffice for the application of calculating the inertial matrix of the object 15 or 45. In fact, because of the simultaneous implementation of movements with the at least three degrees of freedom of the platform, such as described above, the determining the inertial matrix is thus simplified and faster than with existing methods, because the time for the measurements is shortened because of the superposition of the three movements which are done one after the other in the prior art.

In an example, the peripheral gears 24 (or 36) are grouped by pairs of gears having 40, 50 and 60 teeth (since the number of teeth is related to the diameter of the gear), the pairs of peripheral gears make respectively 15, 12 and 10 rotations per complete cycle of measurements. If, for example, a measurement point is defined every five teeth, then there will be 8, 10 and 12 measurement points respectively per rotation of each pair of gears and 120 measurement points in total for a complete cycle. If one measurement point is defined per tooth, then there will be 600 measurement points per complete cycle.

In real time, the force sensors 19 (or 49) collect information about longitudinal forces experienced by at least three of the supports (which could be all, a portion or none of the controlled supports) at each point from the predefined set of measurement points and the sensor 51 collects the times of going by these positions. The communication module 22a receives this information and stores it before sending it to the calculation module 22b of the central unit 22 (or 48). In an embodiment, the first speed V1 is constant. The first speed V1 is predefined depending on a second speed V2 (or maximum speed) at which the system is going to be driven in step 64.

The maximum speed is preferably chosen depending on the size of the tested object 15 (or 45); this is done so that the component of the inertial forces in the supports (controlled or not) 16 is the same order of magnitude as the component of the weight in the support 16 (or 46) so that the supports 16 (46) remain compressed during movements of the device 10 (or 40), thus avoiding parasitic movements which could be induced by the mechanical play. This maximum speed depends on the inertia of the object 15 (or 45) and the dimensions of the device 10 (or 40). It can be determined experimentally for each object 15 (or 45) by progressively increasing it up to the limit of transition in traction of one of the connecting rods. Typically, for an object whose length is of order a few tens of centimeters, this speed corresponds to a rotational frequency of a few hertz for the peripheral gears. In one embodiment, this maximum speed is inversely proportional to the size of the object to be measured.

The minimum speed is preferably chosen to be the lowest possible while remaining consistent with an acceptable test time. In one embodiment, the minimum speed is slower than half the maximum speed. As an example, in the embodiment where the pairs of peripheral gears have diameter is respectively proportional to 4, 5 and 6, for maximum frequency of 2 Hz for the smallest gear, the length of the complete cycle at the maximum speed corresponding to 15 revolutions of the small gear will therefore be 7.5 seconds. If a minimum speed is chosen equal to ⅓ of the maximum speed, the length of the cycle at the minimum speed will be 22.5 seconds; on the whole this allows making a complete measurement in less than one minute including the transitional phases between the two cycles.

Thus, the step 62, when the motor drives the drive device 20 (or 30) at the first speed V1, the central toothed gear 23 (or 32) gives the platform a periodic movement having at least three degrees of freedom. For the device 40, the motors 47 are programmed so that the cylinders 46 each have a periodic movement and comprise at least three mutually different periods, submultiples of the same period of the platform 14.

In step 64, the device 10 (or 40) is driven in movement to perform a second cycle of measurements. The second cycle of measurements is done at the second speed V2, different from the first speed V1. The platform 14 (or 44) again goes by each point of the predefined set of points, this time at the second speed V2. In real time the force sensors 19 (or 49) collect information on longitudinal forces experienced by the controlled supports (connecting rods 16 or cylinders 46) at each point in the predefined set of measurement points. The communication module 22a receives this information and stores it before sending it to the calculation module 22b. In an embodiment, the second speed V2 is faster than the first speed V1. In an embodiment, the second speed V2 is at least twice as fast as the first speed V1. In an embodiment, the second speed V2 is constant. In an embodiment, the second speed V2 is the maximum speed, such as determined above.

In an embodiment, the step 62 is done at the maximum speed and the step 64 is done at the minimum speed. In an embodiment, the steps 62 and 64 can be repeated with more than two different speeds for the purpose of improving the measurement precision. The first and second cycles do not have to be done sequentially. For example, the first and second measurement cycles are done together by a variable speed drive so as to go by the same predefined positions of the platform 14 at least twice with two different speeds. Thus, in an embodiment, the steps 62 and 64 may be replaced by a single step 63 consisting of passing by the predefined positions one or more times with a periodic drive speed. In this case, it is preferred that the ratio of the maximum to minimum drive speeds be at least equal to two. In an embodiment, the steps 62 and 64 or 63 may be repeated by reversing the direction of the drive speed. With this additional step, components of the forces which depend on the direction of the drive speed such as, for example, aerodynamic or solid friction forces in the joints of the device can be eliminated from the calculation of the inertial properties of the object 15 (or 45).

The method could include several steps similar to steps 62 and 64.

In step 66, the calculation module 22b of the central unit 22 (or 48) determines, in an embodiment, at least one of the inertial properties of the object 15 (or 45). In the embodiment where a small number, at least equal to three, of predefined positions of the device 10 (or 40) are used, the calculation of the inertial properties can be done by a least-squares method by determining the properties which best correspond to the measurements done as a function of the measured forces, positions and speeds. In the embodiment where the connecting rods 16 are connected to peripheral toothed gears 24 (or 36) with same diameter pairs, if at least five equally spaced positions are used on the smallest diameter gears, and if the device 10 is moved by making complete cycles at constant speed, then the calculation of the inertial matrix turns out to be simplified. Using Fourier filtering, the isolated movement of each pair of connecting rods 16 and the associated forces (the others being considered as fixed) for each elementary movement can be extracted which makes it possible to deduce the inertia matrix according to conventional techniques.

In an embodiment, it is then advantageous to calculate, for each full cycle both the average value of the forces for each force sensor 19 and also the frequency component (Fourier filtering) corresponding to the fundamental frequency of each connecting rod pair, meaning the frequency of rotation of the associated gear pair. For the average position of the platform 14, the average value of the forces corresponds to the effect of the weight alone. It is identical for all measurement cycles, regardless of the speed and direction chosen in steps 62, 64 and 63. The frequency component corresponds to the effect of the rotation around a single axis defined by the movement of only one pair of connecting rods 16, with the lower ends 18 of the other connecting rods 16 fixed at their average position. For each frequency, the corresponding component is itself the sum of:

The effect of displacement of the center of gravity which is independent of the velocity;

The effect of the rotational inertia forces which is proportional to the square of the velocity; and The effect of aerodynamic forces or solid friction or slight variations in the drive speed. These forces alone depend on the direction of the drive speed and can be eliminated by taking the average of the components obtained for two drive speeds with the same value and opposite direction.

Thus, using components for one given frequency obtained for at least two different speeds, the effects of movement of the center of gravity and rotational inertia for each of the three axes of rotation can be separated. The combination of this information for the three axes makes it possible to fully reconstruct the position of the center of gravity and the inertial matrix.

The average position of the platform 14 and the axes of rotation corresponding to the movement of a single pair of connecting rods 16, can be determined from the geometry of the various elements or identified by external position measurement means during the calibration phase. These data are independent of the object measured and the drive speed. Likewise, the geometry of the various elements makes it possible to know, for each predefined position, the matrix for switching between the forces in the connecting rods 16 and the torsor of the force is applied to the platform 14. The same method applies to the hexapod positioning head 40 driven by the cylinders 46.

The above description is intended to only be one example, and the person skilled in the art will recognize that changes can be made to the embodiments described without going outside the scope of the disclosed invention. Other embodiments which come under the scope of the present application will appear to the person skilled in the art in light of a review of this description and such modifications are seen to come under the attached claims.

The invention claimed is:

1. A device for moving an object, the device comprising:
a base and a platform able to receive the object;
six supports each having an upper end connected to the platform and a lower end connected to the base, where the upper end and lower end of each support in combination have at least five degrees of freedom; and
an actuation device connected to at least three of the supports, where the actuation device is suited for giving predefined periodic movements to said at least three of the six supports, these three supports being called controlled supports, thus giving a periodic movement to the platform relative to the base with at least three degrees of freedom,
wherein said periodic movement is composed of at least three elementary periodic movements each defining a degree of freedom of the movement of the platform, where each of said three periodic elements movements has a period, called elementary period, different from each other, where the elementary periods are submultiples of the period of the periodic movement of the platform, and the movements of the platform along each other periodic elementary movements are algebraically independent from each other.

2. The device according to claim 1, wherein a ratio between the period of the platform and a largest of the elementary periods is less than or equal to 10.

3. The device according to claim 1, wherein the six supports are connecting rods; and
the actuation device comprises a drive device mechanically connecting said controlled supports, where the drive device is controlled by a single actuator.

4. The device according to claim 3, wherein the drive device includes:
a central toothed gear rotatable by the actuator;
three intermediate toothed gears meshed with the central toothed gear; and
six peripheral toothed gears meshed by pairs on each of the three intermediate toothed gears; where
said at least three controlled supports are six controlled supports; and
the six controlled supports have the lower end thereof connected eccentrically to each of said respective peripheral toothed gears.

5. The device according to claim 3, wherein the drive device includes:
a central toothed gear rotatable by the actuator; and
at least three peripheral toothed gears meshed with the central toothed gear, and said at least three controlled supports have the lower end thereof connected respectively and eccentrically the each of said at least three peripheral toothed gears.

6. The device according to claim 5, wherein the six peripheral toothed gears are grouped by same diameter pairs, where the diameters of the peripheral toothed gears of each pair are different from one pair to the next.

7. The device according to claim 6, wherein the same diameter peripheral toothed gears each have one center;
the centers form the vertices of a hexagon; and
the same diameter peripheral toothed gears are arranged along opposite vertices of the hexagon that they form.

8. The device according to claim 6, wherein side-by-side diameters of the pairs of same diameter peripheral toothed gears are proportional to three mutually prime integers.

9. The device according to claim 8, wherein side-by-side diameters of same diameter peripheral toothed gears are respectively proportional to 4, 5 and 6, or to 10, 12 and 15.

10. The device according to claim 6, wherein connecting rods connected to the peripheral toothed gears of a single same diameter pair have opposite phase.

11. The device according to claim 1, further comprising:
at least three longitudinal force sensors associated with at least three of the six supports; and
one central unit connected to the actuation device and to the at least three longitudinal force sensors where the central unit is suited to collect force information from said at least three longitudinal force sensors.

12. The device according to claim 11, wherein the six supports are connecting rods; and
the actuation device comprises a drive device mechanically connecting said controlled supports, where the drive device is controlled by a single actuator, and
wherein the drive device includes:
a central toothed gear rotatable by the actuator; and
at least three peripheral toothed gears meshed with the central toothed gear, and said at least three controlled supports have a lower end thereof connected respectively and eccentrically the each of said at least three peripheral toothed gears, further comprising a position sensor suited for detecting a passage of the central toothed gear through at least three preset positions, where said position sensor communicates with the central unit for deducing from it a speed of the central toothed gear upon going by each of said at least three preset positions.

13. A method for moving an object using the device according claim 1, and further comprising:

driving the device by said actuation device in a way to give a periodic movement to the platform with said at least three degrees of freedom.

14. The method according to claim 13 using the device according to claim 11, wherein the step of driving the device comprises:

driving the device by said actuator device in order to go by each position of a predefined set of positions of the platform with at least a first speed and a second speed, thus executing at least one first and one second measurement cycle, where the predefined set of positions comprises at least three positions for which instantaneous movements of the platform in these positions are mutually algebraically independent;

collecting force information for each position of the predefined set of positions of the platform during driving with said at least first speed and second speed by the central unit; and determining at least one inertial property by the central unit with the movements of the platform and force information corresponding to these movements.

15. The method according to claim 14 in combination with the device according to claim 12, wherein, for each of said at least first and second speeds, the central unit collects data from the position sensor of the central toothed gear for each position in the predefined set of positions of the platform, and the central unit averages data from the position sensor in order to deduce from it a real average speed of the central toothed gear for each of said at least first and second measurement cycles.

16. The method according to claim 14, wherein the step of determining the at least one inertial property from the data comprises an extraction of one average value and of components of each force by Fourier filter over the fundamental frequencies of the periodic elementary movements for each of said at least one first and second measurement cycles.

* * * * *